US009228686B2

(12) United States Patent
Peters et al.

(10) Patent No.: US 9,228,686 B2
(45) Date of Patent: Jan. 5, 2016

(54) TRANSMISSION LINE FOR DRILL PIPES AND DOWNHOLE TOOLS

(71) Applicants: Volker Peters, Wienhausen (DE); Detlev Benedict, Celle (DE); Robert Buda, Lower Saxony (DE); Stephan Mueller, Celle (DE); Henning Rahn, Celle (DE); Rene Schulz, Saxony (DE)

(72) Inventors: Volker Peters, Wienhausen (DE); Detlev Benedict, Celle (DE); Robert Buda, Lower Saxony (DE); Stephan Mueller, Celle (DE); Henning Rahn, Celle (DE); Rene Schulz, Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 236 days.

(21) Appl. No.: 13/687,618

(22) Filed: Nov. 28, 2012

(65) Prior Publication Data

US 2014/0144537 A1    May 29, 2014

(51) Int. Cl.
   *F16L 55/00*    (2006.01)
   *F16L 15/00*    (2006.01)
   *F16L 25/01*    (2006.01)

(52) U.S. Cl.
   CPC ............... *F16L 55/00* (2013.01); *F16L 15/00* (2013.01); *F16L 25/01* (2013.01); *Y10T 29/49117* (2015.01)

(58) Field of Classification Search
   CPC ............ F16L 55/00; F16L 15/00; F16L 25/01
   USPC .................. 138/108, 109; 439/191, 578, 585;
                       174/70 R, 71 C, 74 R, 75 C, 78
   See application file for complete search history.

(56) References Cited

U.S. PATENT DOCUMENTS

| 3,492,409 | A | * | 1/1970 | Williams et al. | 174/78 |
| 5,214,243 | A | * | 5/1993 | Johnson | 174/36 |
| 5,894,104 | A | * | 4/1999 | Hedberg | 174/36 |
| 6,452,102 | B1 | * | 9/2002 | DeForest et al. | 174/75 C |
| 6,830,467 | B2 | * | 12/2004 | Hall et al. | 439/194 |
| 6,844,498 | B2 | * | 1/2005 | Hall et al. | 174/75 C |
| 6,913,093 | B2 | * | 7/2005 | Hall et al. | 175/57 |
| 7,038,134 | B2 | * | 5/2006 | Daugherty et al. | 174/75 C |
| 7,041,908 | B2 | * | 5/2006 | Hall et al. | 174/75 C |
| 8,138,420 | B2 | * | 3/2012 | Amato | 174/102 R |
| 8,157,594 | B2 | * | 4/2012 | Gilliam | 439/607.41 |
| 8,574,006 | B2 | * | 11/2013 | Gilliam | 439/607.41 |
| 2002/0014334 | A1 | | 2/2002 | Chau et al. | |
| 2002/0193004 | A1 | | 12/2002 | Boyle et al. | |
| 2004/0149471 | A1 | * | 8/2004 | Hall et al. | 174/21 R |
| 2005/0067159 | A1 | | 3/2005 | Hall et al. | |
| 2005/0070144 | A1 | * | 3/2005 | Hall et al. | 439/191 |
| 2005/0074998 | A1 | * | 4/2005 | Hall et al. | 439/191 |

(Continued)

OTHER PUBLICATIONS

Shah, et al. "Design Considerations for a New High Data Rate LWD Acoustic Telemetry System" SPE 88636. SPE Asia Pacific Oil and Gas Conference and Exhibition held in Perth, Australia, Oct. 18-20, 2004. 7 pages.

(Continued)

*Primary Examiner* — J. Casimer Jacyna
*Assistant Examiner* — Benjamin R Shaw
(74) *Attorney, Agent, or Firm* — Cantor Colburn LLP (57) ABSTRACT

A method of forming a wired pipe transmission line includes: providing an assembly that includes an inner conductor surrounded by an insulating material; attaching a fixation element to the assembly at or near an end thereof; providing a tubular outer conductor; disposing the assembly and the fixation element within the outer conductor; and fixedly attaching the fixation element to the inner portion of the tubular outer conductor.

7 Claims, 7 Drawing Sheets

(56) References Cited

U.S. PATENT DOCUMENTS

| | | | |
|---|---|---|---|
| 2006/0178047 A1* | 8/2006 | Croan | 439/578 |
| 2006/0283606 A1 | 12/2006 | Partouche et al. | |
| 2007/0169929 A1 | 7/2007 | Hall et al. | |
| 2008/0003856 A1* | 1/2008 | Hall et al. | 439/191 |
| 2010/0035457 A1* | 2/2010 | Holliday | 439/345 |
| 2010/0264650 A1* | 10/2010 | Braden et al. | 285/333 |
| 2010/0304598 A1* | 12/2010 | Kari | 439/352 |
| 2011/0124222 A1* | 5/2011 | Malak | 439/578 |

OTHER PUBLICATIONS

Notification of Transmittal of the International Preliminary Report on Patentability and the Written Opinion of the International Searching Authority, or the Declaration; PCT/US2013/071176; Jun. 11, 2015, 6 pages.

\* cited by examiner

TRANSMISSION LINE FOR DRILL PIPES AND DOWNHOLE TOOLS

BACKGROUND

During subterranean drilling and completion operations, a pipe or other conduit is lowered into a borehole in an earth formation during or after drilling operations. Such pipes are generally configured as multiple pipe segments to form a "string", such as a drill string or production string. As the string is lowered into the borehole, additional pipe segments are coupled to the string by various connection mechanisms, such as threaded couplings.

Various power and/or communication signals may be transmitted through the pipe segments via a "wired pipe" configuration. Such configurations include electrical, optical or other conductors extending along the length of selected pipe segments or string segments. The conductors are operably connected between pipe segments by a variety of configurations.

One such configuration includes a threaded male-female configuration often referred to as a pin box connection. The pin box connection includes a male member, i.e., a "pin end" that includes an exterior threaded portion, and a female member, i.e., a "box end", that includes an interior threaded portion and is configured to receive the pin in a threaded connection.

Some wired pipe configurations include a transmission device mounted on the tip of the pin end as well as in the box end. The transmission device, or "coupler," can transmit power, data or both to an adjacent coupler. The coupler in the pin end is typically connected via a coaxial cable or other means to the coupler in the box end.

BRIEF DESCRIPTION

Disclosed herein is a wired pipe system that includes a wired pipe segment having a first end and a second end and a first coupler in the first end and a second coupler in the second end. The system also includes a transmission medium disposed in the wired pipe segment between the first and second ends and providing at least part of an electrical path between the first and second couplers. The transmission line includes an assembly that includes an inner conductor surrounded over at least a portion of its length by an insulating material, a fixation element surrounding and attached to the assembly at or near an end of the assembly, and an outer conductor surrounding at least a portion of a length of the assembly and the fixation element, the outer conductor being fixedly connected to the fixation element.

Also disclosed is method of forming a wired pipe transmission line that includes: providing an assembly that includes an inner conductor surrounded by an insulating material; attaching a fixation element to the assembly at or near an end thereof; providing a tubular outer conductor; disposing the assembly and the fixation element within the outer conductor; and fixedly attaching the fixation element to the inner portion of the tubular outer conductor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system, apparatus and method are presented herein by way of exemplification and not limitation with reference to the Figures.

Figure 1:
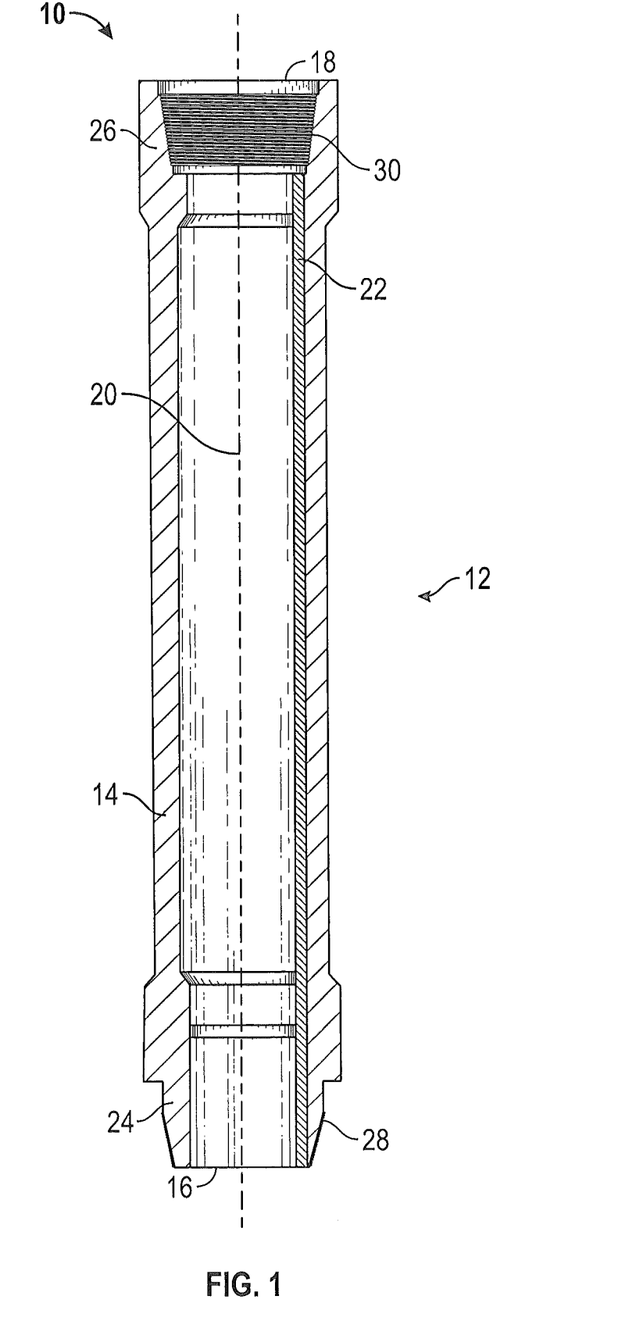
FIG. 1 depicts an exemplary embodiment of a wired pipe segment of a well drilling and/or logging system.

Referring to FIG. 1, an exemplary embodiment of a portion of a well drilling, logging and/or production system 10 includes a conduit or string 12, such as a drillstring or production string, that is configured to be disposed in a borehole for performing operations such as drilling the borehole, making measurements of properties of the borehole and/or the surrounding formation downhole, or facilitating gas or liquid production.

For example, during drilling operations, drilling fluid or drilling "mud" is introduced into the string 12 from a source such as a mud tank or "pit" and is circulated under pressure through the string 12, for example via one or more mud pumps. The drilling fluid passes into the string 12 and is discharged at the bottom of the borehole through an opening in a drill bit located at the downhole end of the string 12. The drilling fluid circulates uphole between the string 12 and the borehole wall and is discharged into the mud tank or other location.

The string 12 may include at least one wired pipe segment 14 having an uphole end 18 and a downhole end 16. As described herein, "uphole" refers to a location near the point where the drilling started relative to a reference location when the segment 14 is disposed in a borehole, and "downhole" refers to a location away from the point where the drilling started along the borehole relative to the reference location. It shall be understood that the uphole end 18 could be below the downhole end 16 without departing from the scope of the disclosure herein.

At least an inner bore or other conduit 20 extends along the length of each segment 14 to allow drilling mud or other fluids to flow therethrough. A transmission line 22 is located within the wired segment 14 to provide protection for electrical, optical or other conductors to be disposed along the wired segment 14. In one embodiment, the transmission line 22 is a coaxial cable. In another embodiment, the transmission line 22 is formed of any manner of carrying power or data, including, for example, a twisted pair. In the case where the transmission line 22 is a coaxial cable it may include an inner conductor surrounded by a dielectric material. The coaxial cable may also include a shield layer that surrounds the dielectric material. In one embodiment, the shield layer is electrically coupled to an outer conductor that may be formed, for example, by a rigid or semi-rigid tube of a conductive material.

The segment 14 includes a downhole connection 24 and an uphole connection 26. The segment 14 is configured so that the uphole connection 26 is positioned at an uphole location relative to the downhole connection 24. The downhole connection 24 includes a male connection portion 28 having an exterior threaded section, and is referred to herein as a "pin end" 24. The uphole connection 26 includes a female connection portion 30 having an interior threaded section, and is referred to herein as a "box end" 26.

The pin end 24 and the box end 26 are configured so that the pin end 24 of one wired pipe segment 14 can be disposed within the box end 26 of another wired pipe segment 14 to effect a fixed connection therebetween to connect the segment 14 with another adjacent segment 14 or other downhole component. In one embodiment, the exterior of the male connection portion 28 and the interior of the female connection portion 30 are tapered. Although the pin end 24 and the box end 26 are described has having threaded portions, the pin end 24 and the box end 26 may be configured to be coupled using any suitable mechanism, such as bolts or screws or an interference fit.

In one embodiment, the system 10 is operably connected to a downhole or surface processing unit which may act to control various components of the system 10, such as drilling, logging and production components or subs. Other components include machinery to raise or lower segments 14 and operably couple segments 14, and transmission devices. The downhole or surface processing unit may also collect and process data generated by the system 10 during drilling, production or other operations.

As described herein, "drillstring" or "string" refers to any structure or carrier suitable for lowering a tool through a borehole or connecting a drill bit to the surface, and is not limited to the structure and configuration described herein. For example, a string could be configured as a drillstring, hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's and drill strings.

Figure 2:
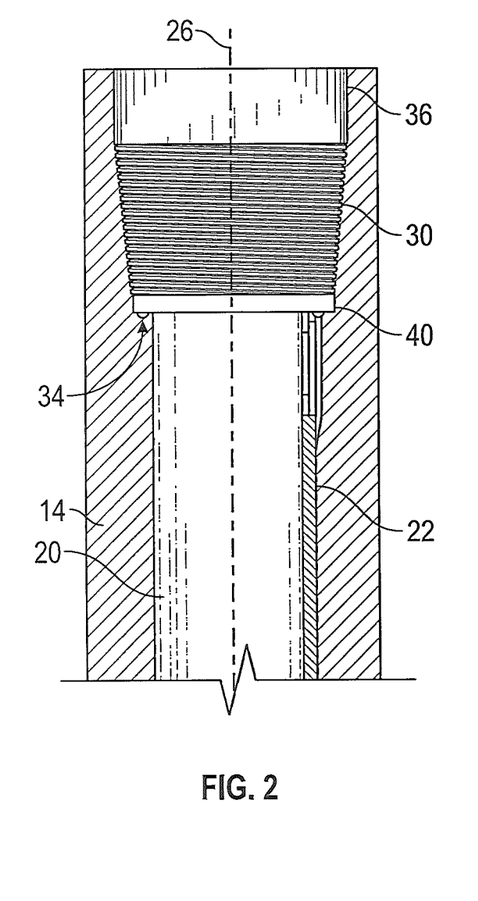
FIG. 2 depicts an exemplary embodiment of a box end of the segment of FIG. 1.
Figure 3:
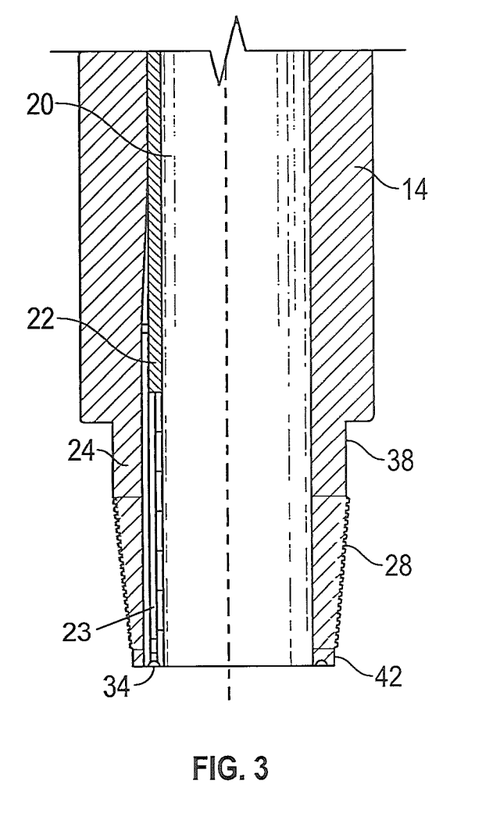
FIG. 3 depicts an exemplary embodiment of a pin end of the segment of FIG. 1.

Referring to FIGS. 2 and 3, the segment 14 includes at least one transmission device 34 (also referred to as a "coupler" herein) disposed therein and located at the pin end 24 and/or the box end 26. The transmission device 34 is configured to provide communication of at least one of data and power between adjacent segments 14 when the pin end 24 and the box end 26 are engaged. The transmission device 34 may be of any suitable type, such as an inductive coil, direct electrical (e.g., galvanic) contacts and an optical connection ring. The coupler may be disposed at the inner or outer shoulder. Further, the transmission device 34 may be a resonant coupler It shall be understood that the transmission device 34 could also be included in a repeater element disposed between adjacent segments 14 (e.g, within the box end). In such a case, the data/power is transmitted from the transmission device in one segment, into the repeater. The signal may then be passed "as is," amplified, and/or modified in the repeater and provided to the adjacent segment 14.

Regardless of the configuration, it shall be understood that each transmission device 34 can be connected to one or more transmission lines 22 by connector 23. Embodiments disclosed herein are directed to how the transmission lines 22 can be formed and disposed in a segment 14. In one embodiment, the transmission line 22 is capable of withstanding the tensile, compression and torsional stresses and superimposed dynamic accelerations typically present in downhole tools when exploring oil, gas or geothermal wells.

In one embodiment, the transmission line 22 includes a wire channel (e.g., an outer protective layer) and a transmission element. The transmission element can be selected from one of coaxial cable, twisted pair wires, and individual wires. The following description is presented with respect to coaxial wire but it shall be understood that the teachings herein are applicable to any type of transmission element. In one embodiment, tension is created in the transmission element with respect to one or both the wire channel and the body of the segment 14. This tension may help to abate independent motion between the transmission element and the wire channel.

Figure 4:
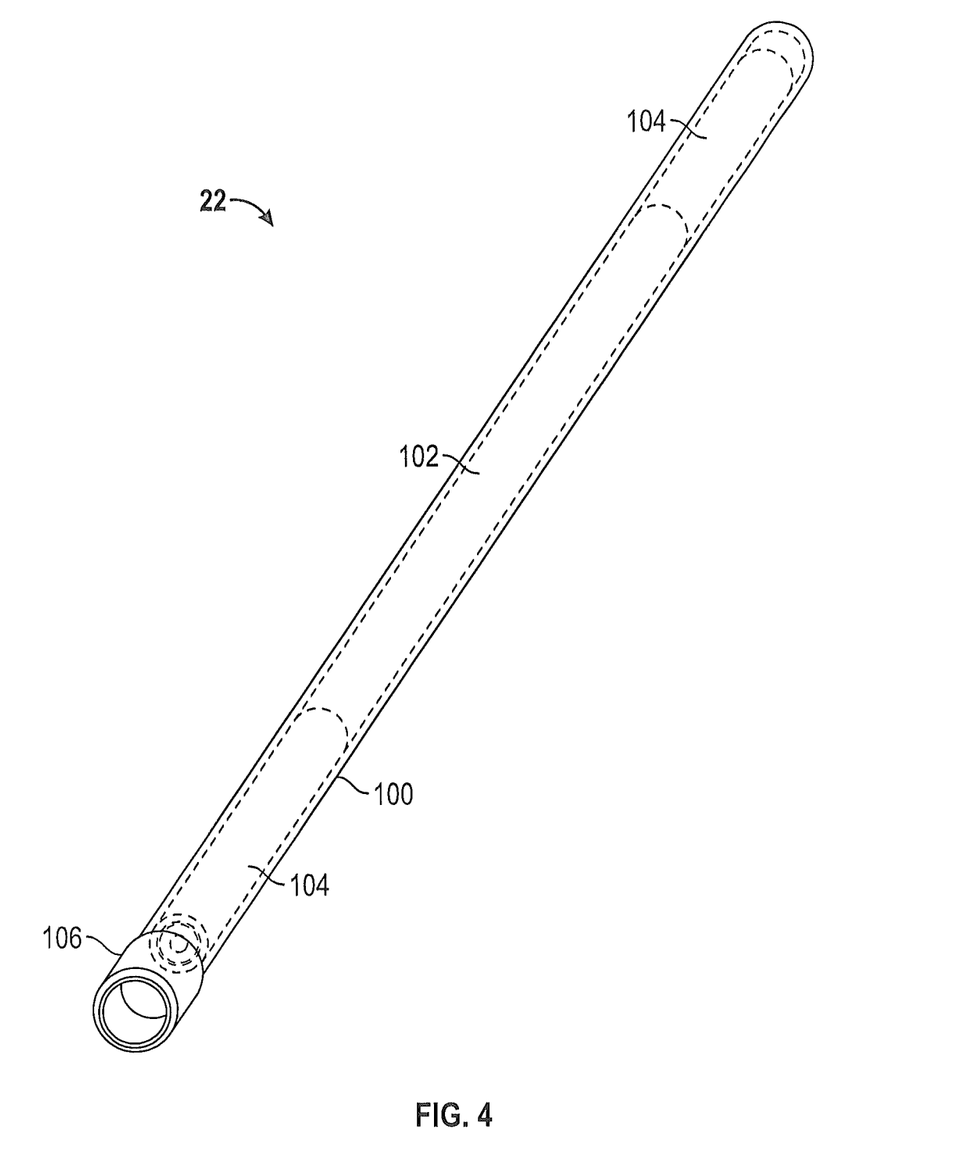
FIG. 4 shows a perspective view of a transmission line.

Referring now to FIG. 4, an example of a transmission line 22 is illustrated in a perspective view. The transmission line 22 includes a wire channel 100 (shown in phantom) surrounding a transmission element 102. The wire channel in the illustrated embodiment includes an attachment shoulder 106 that can be used rigidly to join it to a segment 14 (FIG. 1). In one embodiment, the wire channel 100 is formed as a tube of an electrically conductive rigid material such as steel and the like. In this manner, the wire channel 100 is electrically coupled to the body of the segments 14 and, as such, is connected to ground.

The transmission element 102 can be any type of element that can transmit an electric signal. This includes, without limitation, a coaxial cable, a twisted pair of wires and individual wires. Given that the wire channel 100 is at a ground level, it shall be understood that the conductive elements of the transmission element 102 are typically surrounded over at least a portion of its length by one or more layers of an insulating material, such as a dielectric, to electrically and physically separate them from the wire channel 100.

Fixation elements 104 are located at or near one or both ends (e.g., in an end region) of the transmission element 102 in general and the insulating material in particular. The fixation elements 104 serve to fixedly attach the transmission element 102 within the wire channel 100. In one embodiment, the attachment is such that the transmission element 102 is in tension with respect to the wire channel 100.

Figure 5:
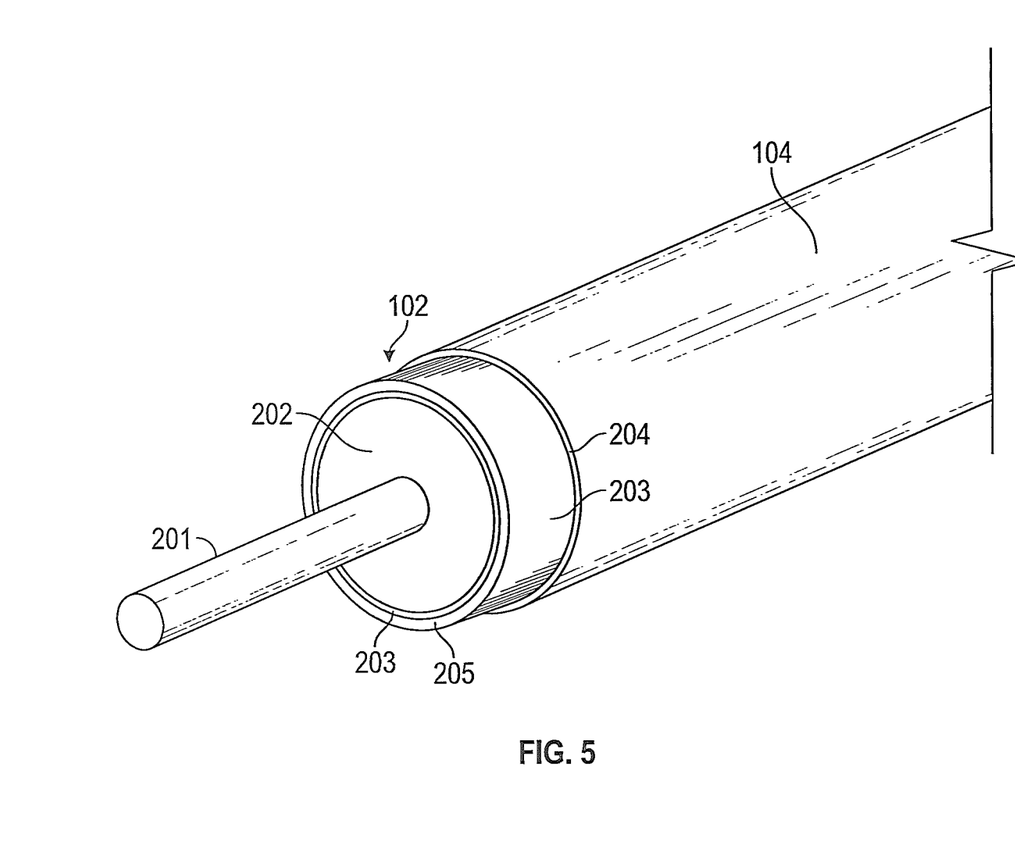
FIG. 5 shows a perspective view of an end of transmission element.

As best seen in FIG. 5, in one embodiment, the transmission element 102 includes an inner conductor 201 surrounded by an insulating layer 202. The inner conductor 201 can be, for example, a solid or stranded wire or a hollow metal tube. The insulating layer 202 is formed of a dielectric material in one embodiment. In one embodiment, the inner conductor 201 extends beyond an end of the insulating layer 202. Such an extension can allow for electrical connection of the inner conductor 201 to another element such as the coupler 34 or a connector attached to the coupler 34 (FIG. 1).

As illustrated, one or more additional layers 203 surround the insulating layer 202 and these layers can include, for example an electrical shielding layer and one or more additional insulating layers. In one embodiment, the insulating layer 202 is formed such that there is little to no relative movement between the insulating layer 202 and the inner conductor 201. As further explained below, no deformation of the channel 100 is required to substantially fix the insulating layer 202 relative to the inner conductor 201. Further, in the event that the inner conductor 201 is hollow, an expansion of it is not needed to substantially fix the insulating layer 202 relative to the inner conductor 201.

As illustrated, the end of the insulating layer 205 extends beyond an end 204 of the fixation element 104 but this is not required. The fixation element 104 may be formed onto the transmission element 102 in a variety of non-compressive manners. For instance, the fixation element 104 could be cold worked on to the transmission element. Alternatively, the fixation element could be glued, chemically or thermally bonded, or elastically clamped to the transmission element 102. In such cases, the portions of the transmission element 102 surrounded by the fixation element may be specially designed, treated and prepared for such purpose.

As shown in FIG. 4, the fixation elements 104 are shown as extending along only a portion of the length of the transmission element 102 in a region at or near the ends thereof. In one embodiment, the fixation elements 104 are less than about 1 meter long. In another embodiment, one or more of the fixation elements 104 do not extend for more than $1/10^{th}$ of the length of the transmission element 102. As the transmission element 102 spans most of the length of a particular segment 14 (FIG. 1), its length can be about 9 meters in one embodiment.

Regardless of how attached, it shall be understood that the transmission element is, in one embodiment, a tube of metal or another rigid material. After being attached to the transmission element 102, the assembly that includes the transmission element 102 and the fixation elements 102 can be inserted into the wire channel 100. The fixation elements 104 are then secured to the wire channel 100. The fixation element 104 may be secured to the wire channel 100 by means of welding, soldering, gluing, or plastically deforming the wire channel 100. Alternative means of fixing the fixation element 104 are shown below.

Figure 6:
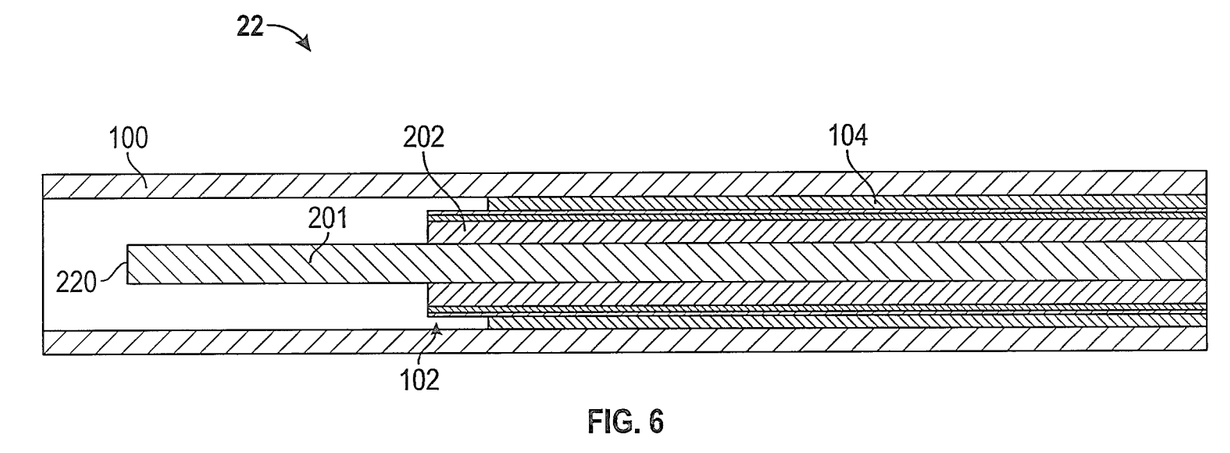
FIG. 6 shows an cut-away side view of an end of transmission line.

FIG. 6 shows a cut-away side view of a region at or near an end of the transmission line 22 shown in FIG. 4. The wire channel 100 extends beyond an end 220 of the communication element 201 in this embodiment. The fixation element 104 can be coupled to the transmission element 102 as described above. After being inserted into the wire channel 100, the fixation element 104 can be press fit or fitted tightly into the wire channel 100, glued, soldered, clamped (with suitable clamping elements like tapered rings) or held by compression caused when forming the wire channel 100 onto the fixation element 104. Unlike in other applications only this short portion of the wire has to be fixed with respect to the wire channel 100 in order to prevent the transmission element 102 from moving with respect to the wire channel 100.

Figure 7:
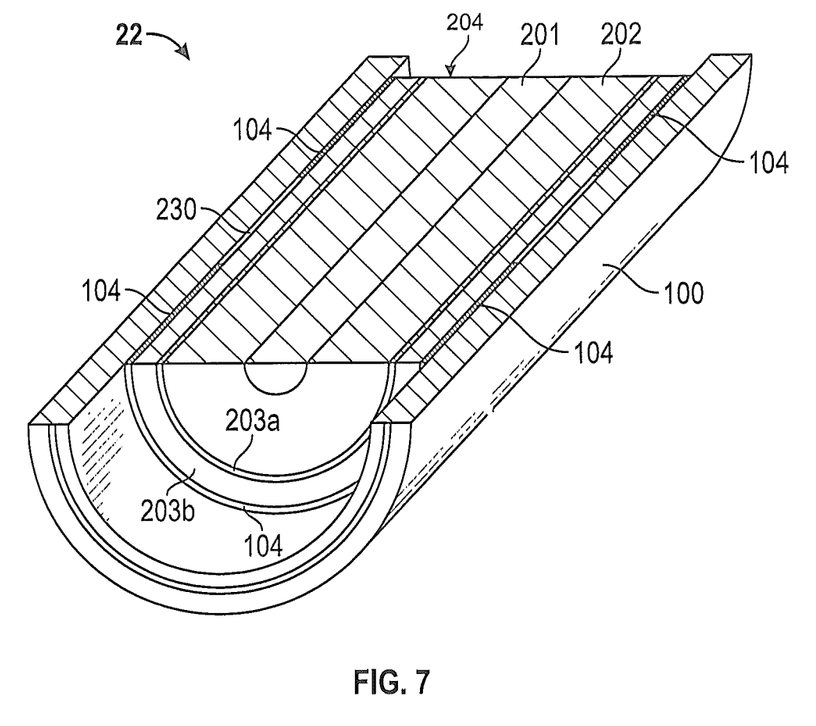
FIG. 7 shows a cut-away section of a transmission line.

FIG. 7 shows a cut-away perspective view of a transmission line 22 that exemplifies the fact that a gap 230 can be formed between the transmission element 102 and the wire channel 100 between the fixation elements 104 disposed at the distal ends of the transmission element 102. In this embodiment, the transmission element 102 is illustrated as including two optional additional layers 203a, 203b that may be, respectively, a shield layer and an insulating layer. In this embodiment the communication element 201 does extend beyond the dielectric layer 202.

In one embodiment, the length of the assembly including the fixation elements 104 and the transmission element 102 may be held in compressive load in all conditions. This may be achieved by manufacturing the assembly such that it is longer than actually needed in final installation. In such a case, as the assembly is placed in the wire channel 100 the transmission element is compressed or otherwise deformed axially such that fixation elements 104 can be affixed to an inner wall of the wire channel. If then later during the installation or while in use in a drill string the wire channel 100 gets elongated the transmission element 102 may still remain in operative contact with other elements and may, in some cases, remain in compression.

In one embodiment, the gap 230 may be filled with a material that serves to support the transmission element 102 within the wire channel 100. Suitable materials included fluids, glue, chemically activated glues, heat activated glues, etc. In addition, the material in the gap 230 may also support the transmission element 102 so as to prevent any lateral movement of it inside the wire channel 100. In such a case, other filling materials in adding to the glues and fluid disclosed above may be utilized. For instance, the gap 230 could be filled with an elastomer or microspheres. Microspheres can be provided within the gap 230 and, as is known in the art, can increase their respective volume when exposed to heat. This volume change may serve to clamp the transmission element 102 tightly within the wire channel 100 without the need to chemically bond it to the channel.

Figures 8A, 8B:
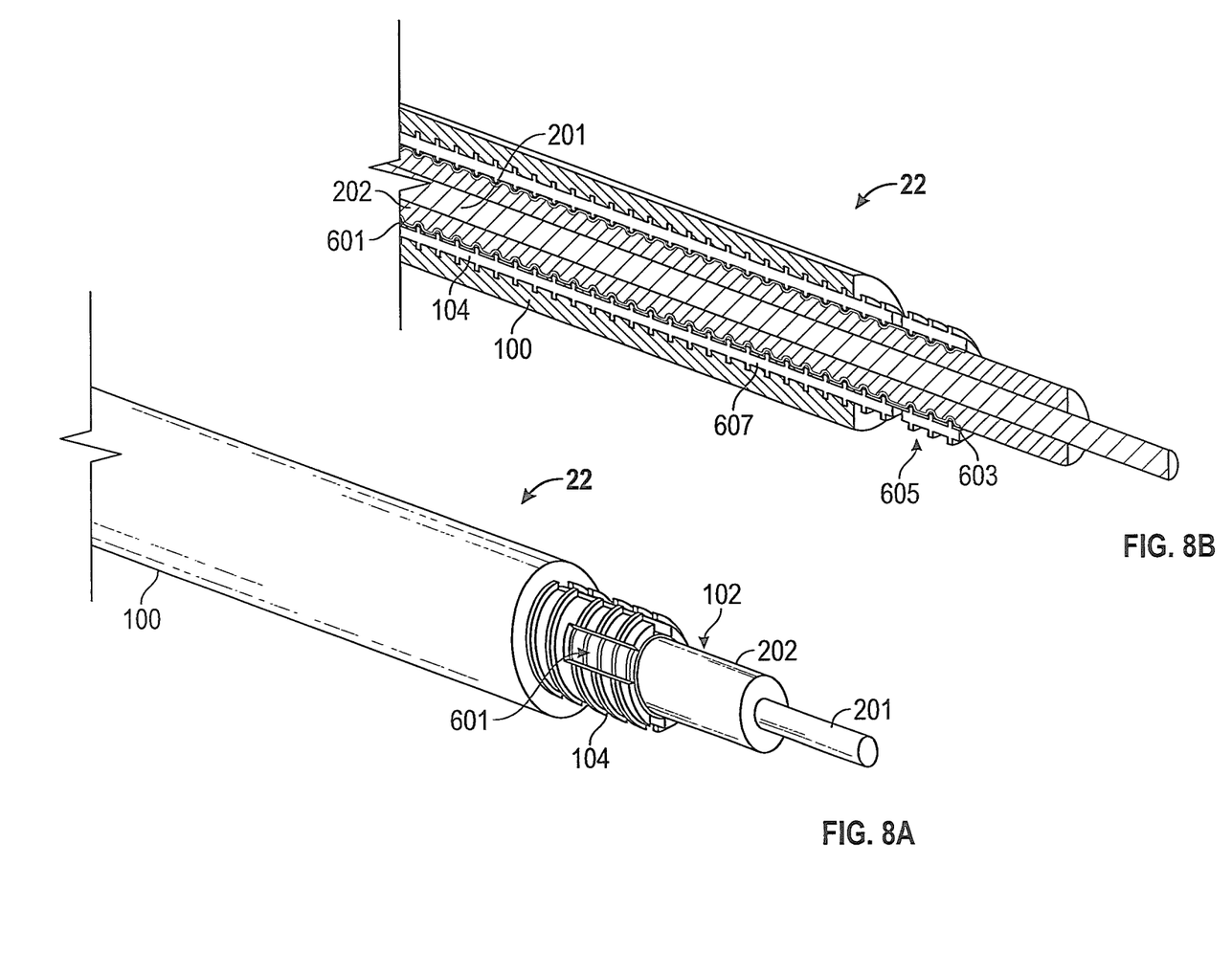
FIGS. 8a and 8b show, respectively, perspective and cut-away side views of an embodiment of a transmission line.

FIGS. 8a and 8b show, respectively, perspective and cut-away side views of an end of a transmission line 22. As before, the transmission line 22 includes a transmission element 102 that includes an inner conductor 201 and an insulating layer 202. In this embodiment, the fixation element 104 includes threads on one or both of an interior or exterior portion thereof. As illustrated, the fixation element 104 includes internal threads 603 and external threads 605. In one embodiment, the internal threads 603 can be omitted and the fixation element 104 can be fixedly attached to one another as described above. In the illustrated embodiment, the internals threads 603 mate with the insulating layer 202. As shown, an optional shielding layer 601 is disposed between the insulating layer 202 and the fixation element 104. In the illustrated embodiment, the interaction of the internal threads 603 and the insulating layer 202 aids in holding them in a fixed relationship relative to one another. Of course, adhesives could also aid in such fixation.

The external threads 605 mate with wire channel internal threads 607. In this manner, transmission element 102 can be held in a fixed position relative to the wire channel 100.

While both the fixation elements and wire channels shown above are in the form of tubular elements, it shall be understood that these elements could be formed by combing two half shells together by, for example, welding or chemical bonding.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A wired pipe system comprising:
  a wired pipe segment having a first end and a second end;
  a first coupler in the first end and a second coupler in the second end; and
  a transmission medium disposed in the wired pipe segment between the first and second ends and providing at least part of an electrical path between the first and second couplers, the transmission medium comprising:
an assembly that includes an inner conductor surrounded over at least a portion of its length by an insulating material;
a fixation element surrounding and attached to the assembly at or near an end of the assembly; and
a wire channel surrounding at least a portion of a length of the assembly and the fixation element, the wire channel being fixedly connected to the fixation element;
wherein the insulating material includes external threads that mate with internal threads of the fixation element.

2. The wired pipe system of claim 1, wherein the fixation element includes external threads that mate with internal threads of the wire channel.

3. A wired pipe system comprising:
a wired pipe segment having a first end and a second end;
a first coupler in the first end and a second coupler in the second end; and
a transmission medium disposed in the wired pipe segment between the first and second ends and providing at least part of an electrical path between the first and second couplers, the transmission medium comprising:
an assembly that includes an inner conductor surrounded over at least a portion of its length by an insulating material;
a fixation element surrounding and attached to the assembly at or near an end of the assembly; and
a wire channel surrounding at least a portion of a length of the assembly and the fixation element, the wire channel being fixedly connected to the fixation element;
wherein the fixation element includes external threads that mate with internal threads of the wire channel.

4. The wired pipe system of claim 3, wherein the wire channel extends beyond an end of at least one of the inner conductor and the insulating material.

5. The wired pipe system of claim 3, further comprising:
a connector disposed at least partially between the assembly and a communication coupler, the connector electrically connecting the communication coupler to the inner conductor.

6. The wired pipe system of claim 5, wherein the connector is at least partially disposed within the wire channel.

7. The wired pipe system of claim 6, wherein a portion of the inner conductor extends beyond an end of the insulating material and is in electrical contact with the connector.

* * * * *